(No Model.) 2 Sheets—Sheet 1.
B. C. BRADLEY.
DRAG BAR FOR CULTIVATOR BEAMS.
No. 297,914. Patented Apr. 29, 1884.
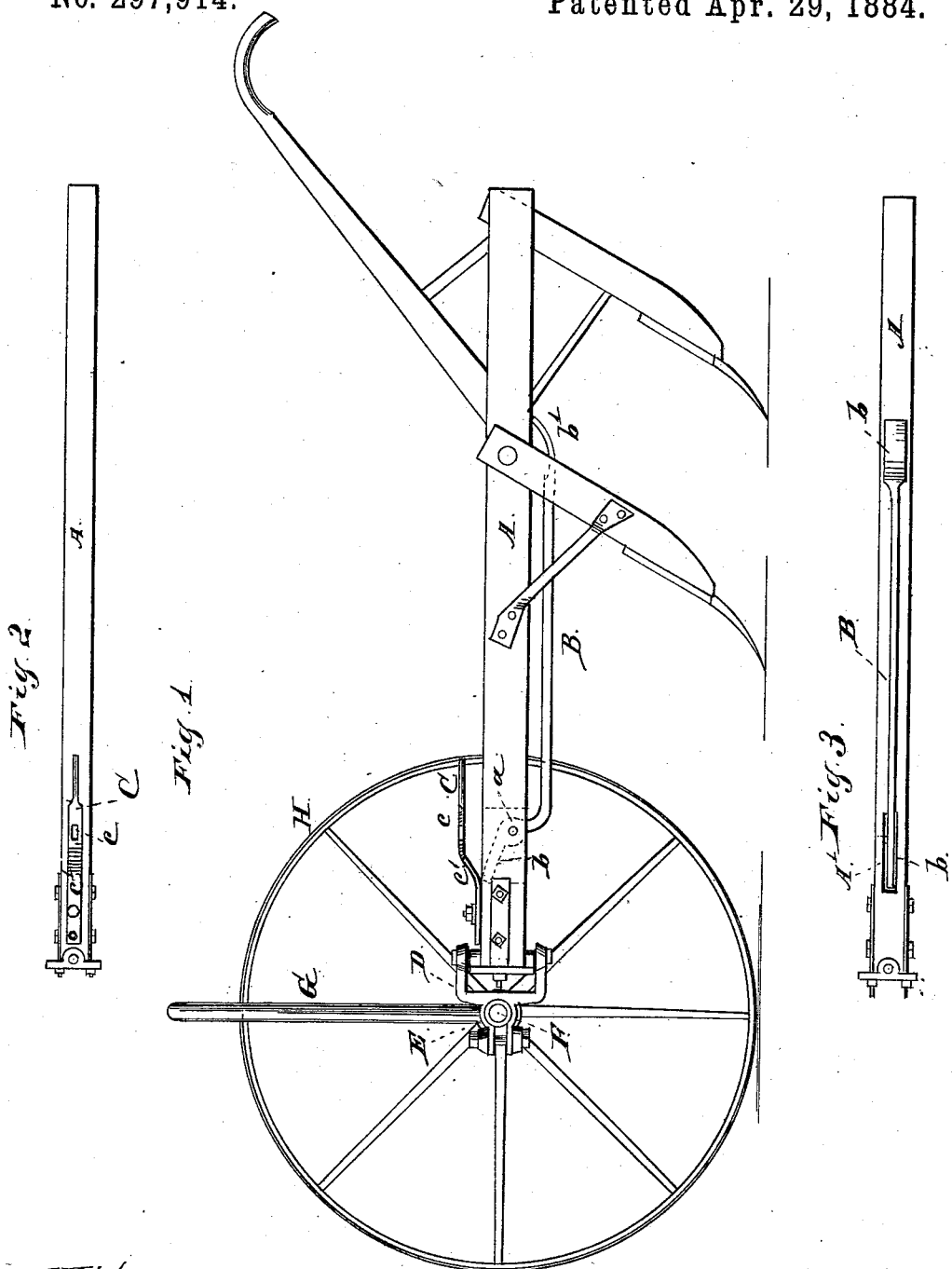
Witnesses:
B. A. Price.
O. W. Bond
Inventor:
Byron C. Bradley (No Model.) 2 Sheets—Sheet 2.
B. C. BRADLEY.
DRAG BAR FOR CULTIVATOR BEAMS.
No. 297,914. Patented Apr. 29, 1884.
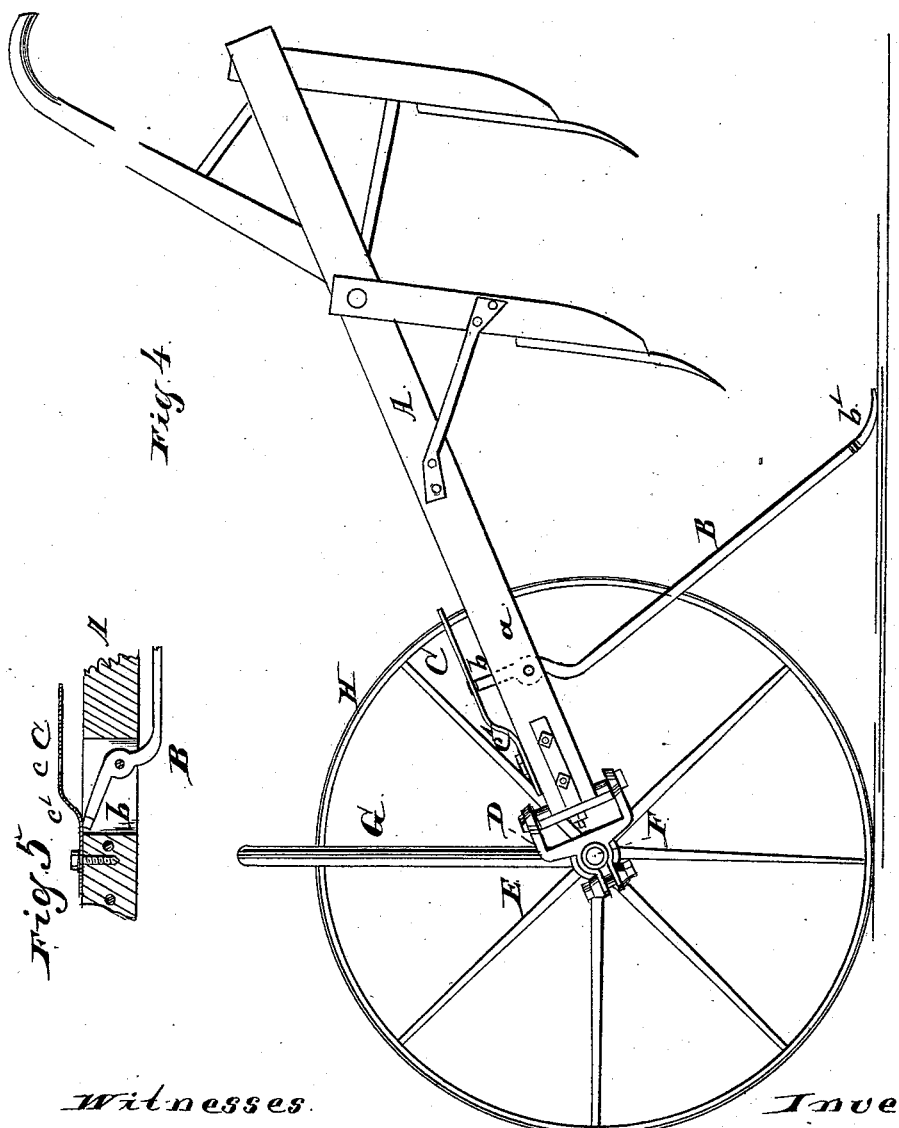
Witnesses
Inventor:
Byron C Bradley

UNITED STATES PATENT OFFICE.

BYRON C. BRADLEY, OF CHICAGO, ILLINOIS, ASSIGNOR TO THE FURST & BRADLEY MANUFACTURING COMPANY, OF SAME PLACE.

DRAG-BAR FOR CULTIVATOR-BEAMS.

SPECIFICATION forming part of Letters Patent No. 297,914, dated April 29, 1884.

Application filed November 26, 1883. (No model.)

*To all whom it may concern:*

Be it known that I, BYRON C. BRADLEY, residing at Chicago, in the county of Cook and State of Illinois, and a citizen of the United States, have invented a new and useful Improvement in Drag-Bars for Cultivator-Beams, of which the following is a full description, reference being had to the accompanying drawings, in which—

Figure 1 is a side elevation showing the drag-bar raised and the beam down for use; Fig. 2, a top or plan view of the beam with the handle, shovel-standards, and shovels removed; Fig. 3, an under side view of the plow-beam without the handle, shovel-standards, and shovels; Fig. 4, a side elevation showing the drag-bar down and the beam elevated out of use; Fig. 5, a detail showing the spring-catch and drag-bar end.

The object of this invention is to apply a drag-bar to beams of that class of cultivators termed "tongueless," and have such drag-bar firmly locked in both its elevated and depressed positions, thereby preventing accidental displacement of such drag-bar in use, no matter whether it is elevated or depressed; and its nature consists in pivoting the drag-bar in a mortise or recess formed in the forward end of the beam, and having its upper end, when the drag-bar is depressed, project above the top of the beam and engage with the hole or opening in a spring-plate attached to the upper face of the beam, and thereby lock and hold firmly the drag-bar in its depressed position, and having this end, when the drag-bar is raised, engage with the spring-plate and lock and hold the drag-bar in its elevated position, all as hereinafter more specifically described, and pointed out in the claim.

In the drawings, A represents a beam made of wood or other suitable material, and having at its forward end a mortise, A'. The beam is to be provided with a handle, and with one or more standards carrying the shovels, as usual.

B is the drag-bar, made of wrought-iron or other suitable material. This bar is attached to the beam by passing its end through the mortise A', and securing it by a suitable pin or pivot, $a$, and the end $b$ of this drag-bar is longer than the depth of beam from the pivot $a$ to the top, so that when the drag-bar is down this end $b$ will project above the top of the beam, and the ground end $b'$ of the drag-bar is widened and curved, so as to run easily and have a bearing on the ground.

C is a spring or spring-plate, one end of which is attached to the beam by a suitable bolt, or otherwise, so as to have its free end over the mortise A'. The spring or spring-plate has an upward bend or curve, $c'$, which raises its free end above the top of the beam, and in the free end is formed a hole or opening, $c$, into which the end $b$ of the drag-bar enters when the drag-bar is depressed, forming an engagement between the end $b$ and the spring or spring-plate, by which the drag-bar will be locked and held firmly against the travel of the machine when in position for holding the beam elevated, and the bend $c'$ is arranged in such relation to the arc described by the end $b$ as to allow the end to pass freely, and at the same time, when the drag-bar is raised, as shown in Fig. 1, have the end $b$ engage with the under face of the spring or spring-plate, and lock and firmly hold the drag-bar in its elevated position. The spring or spring-plate C is to be of such rigidity as not to yield readily, and at the same time allow a pull to disengage the end $b$ from the hole $c$, or a push to disengage it from the under face of the plate, and the plate C and end $b$ are arranged in relation to each other to have sufficient retention to hold the two together in the ordinary running of the machine.

D is the stirrup, between the arms of which the front end of the beam is pivoted, so as to have a lateral swing.

E is the pipe-box, to which the stirrup D is clasped and secured.

F is the wheel-spindle.

G is the arch or axle.

H is the wheel, between the hubs of which and the arch the pipe-box E is mounted on the spindles F. These parts D E F G H may be of the form of construction and arrangement shown, or of any other well-known form of construction and arrangement, and they, with the parts of a tongueless cultivator not represented, form no part of the present invention, which relates simply to the drag-bar and the pivoting and locking thereof, so that it will be held firmly in either its elevated or depressed position. The extension or end $b$ of the drag-bar B, in conjunction with the spring or spring-plate C, with which it acts, forms a lock by which the drag-bar is held firmly in position for use, and by which it is also held in position when raised and out of use.

The drag-bar and spring can be used on other forms of cultivators.

What I claim as new, and desire to secure by Letters Patent, is as follows:

The combination, with a beam, A, of the drag-bar B, having a projecting end, $b$, and a spring or spring-plate, C, having an opening, $c$, substantially as and for the purposes specified.

BYRON C. BRADLEY.

Witnesses:
B. A. PRICE,
O. W. BOND.